Feb. 24, 1931.  A. L. DORFNER  1,794,281
LIQUID FILTER
Filed June 12, 1929  4 Sheets-Sheet 1

Inventor:-
Anton L. Dorfner;
by his Attorneys
Howson & Howson

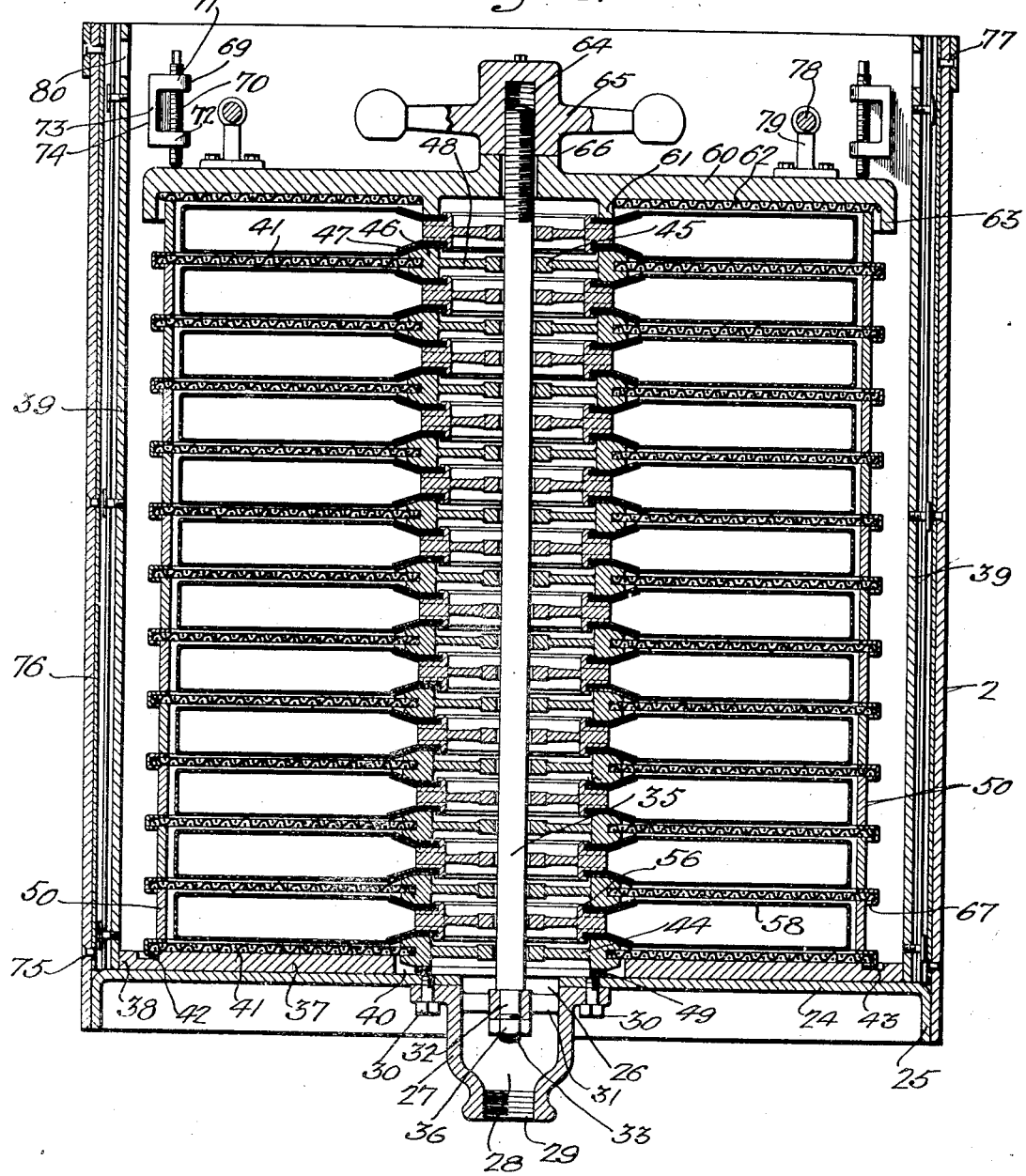

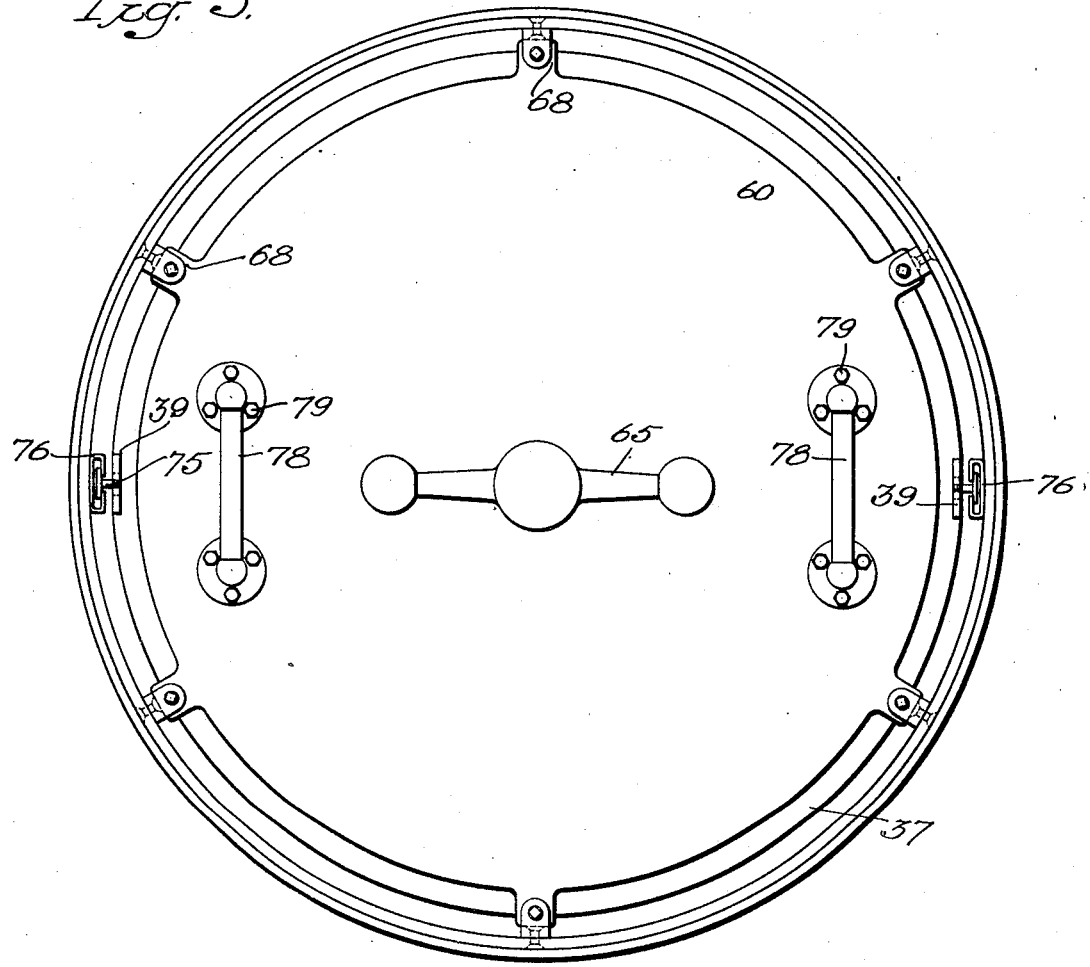

Feb. 24, 1931.  A. L. DORFNER  1,794,281
LIQUID FILTER
Filed June 12, 1929    4 Sheets-Sheet 4
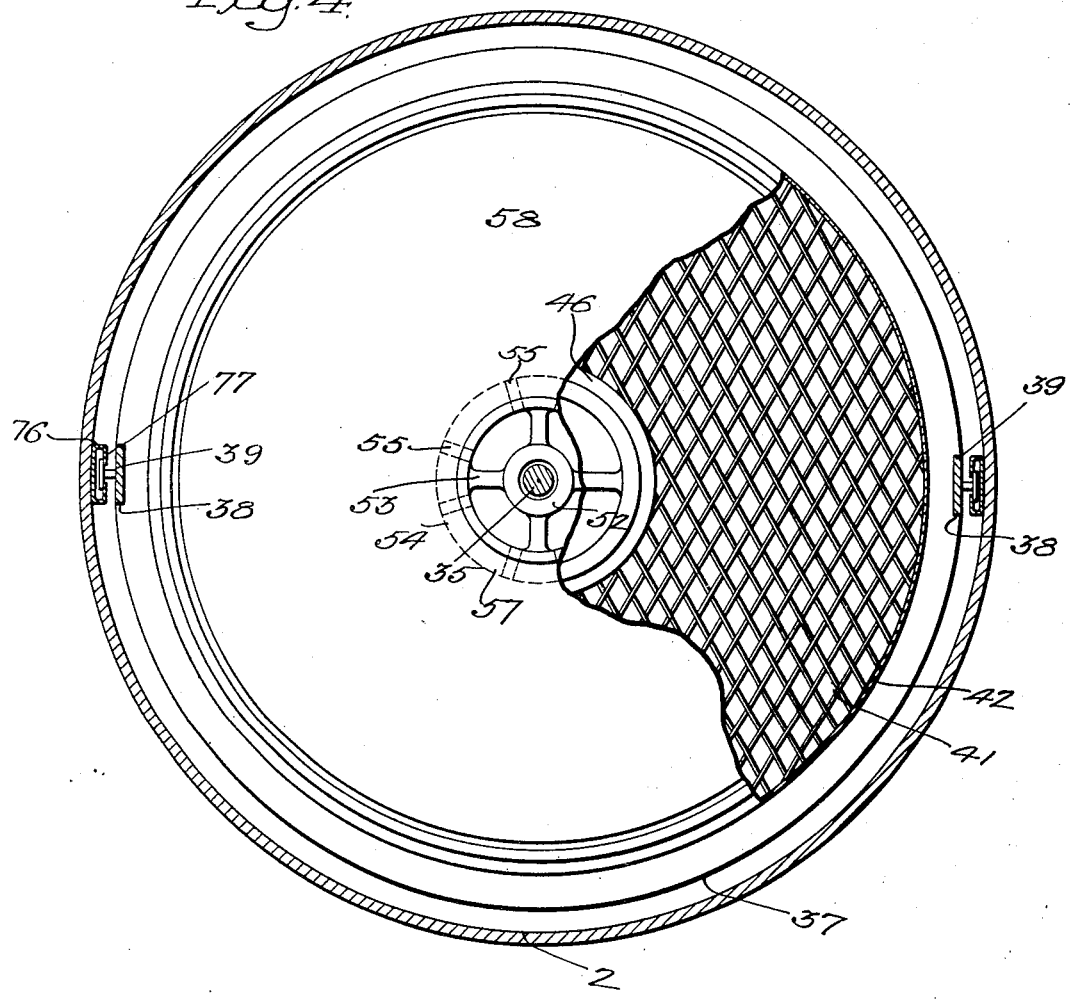

Patented Feb. 24, 1931

1,794,281

UNITED STATES PATENT OFFICE

ANTON L. DORFNER, OF PHILADELPHIA, PENNSYLVANIA

LIQUID FILTER

Application filed June 12, 1929. Serial No. 370,387.

This invention relates to a liquid filter, and is more particularly concerned with a continuous filter of large capacity adapted more especially to the cleaning of the dirty solvent in garment cleaning establishments.

Filtration as practiced at the present time, is frequently prevented by the nature of the solid matter encountered in the dirty solution. Some of the solids, when collected in a filter, form impervious matter which does not allow the liquid being filtered to pass on through the filter. This often causes pressure to build up to such a point in the filter that there is danger of bursting the filter bags or screens, thus allowing the sediment or solids to pass on through with the filtrate, thereby re-contaminating it, and making it necessary to re-filter the liquid.

The success of such a filter so far as the removal of solids from a liquid is concerned, is directly dependent upon the mesh or fineness of the filter bag or screens. The finer the mesh, the more complete the removal of solids. At the same time, however, the finer the mesh of the bag or screen, the less is the capacity of the filter, and the more likely it is that the pressure will rapidly build up within the filter.

By my construction, a plurality of filters are employed in parallel relation with one another, whereby only a portion of the total quantity of liquid to be filtered is passed through any one filtering medium. The novelty in my invention, then, consists primarily in avoiding the objects of the prior art; in employing a number of filtering elements in parallel relation with one another; and in the constructional details of my filtering apparatus.

An object of the invention, therefore, is to avoid the difficulties encountered in the filtering practice according to the prior art.

Another object is to device a new form of filtering apparatus.

Another object is to produce a filtering apparatus employing a number of filtering elements arranged in parallel relation with one another.

Another object is to arrange a filtering apparatus of such design that excess pressure resulting from clogging of the filtering mediums is prevented from affecting the container walls.

Another feature is resident in the assemblage of the filtering bags with relation to the filtering screens.

Another feature is resident in the construction of a filtering bag.

Another feature is found in the construction of the certain collars of the device.

Yet another feature is resident in the combination of the collars to the filtering bags.

Still another feature is found in the novel form of pressure rings.

Other objects and advantages will appear hereinafter.

In the drawings, in which is illustrated one form of my device,

Fig. 2 is a vertical section on a somewhat enlarged scale of the filtering device, according to my invention;

Fig. 3 is a plan view of the structure of Fig. 2; while

Fig. 4 is a transverse section through the device of Fig. 2, a part of the filtering bag being broken away to show the construction of the screen.

Figure 1:
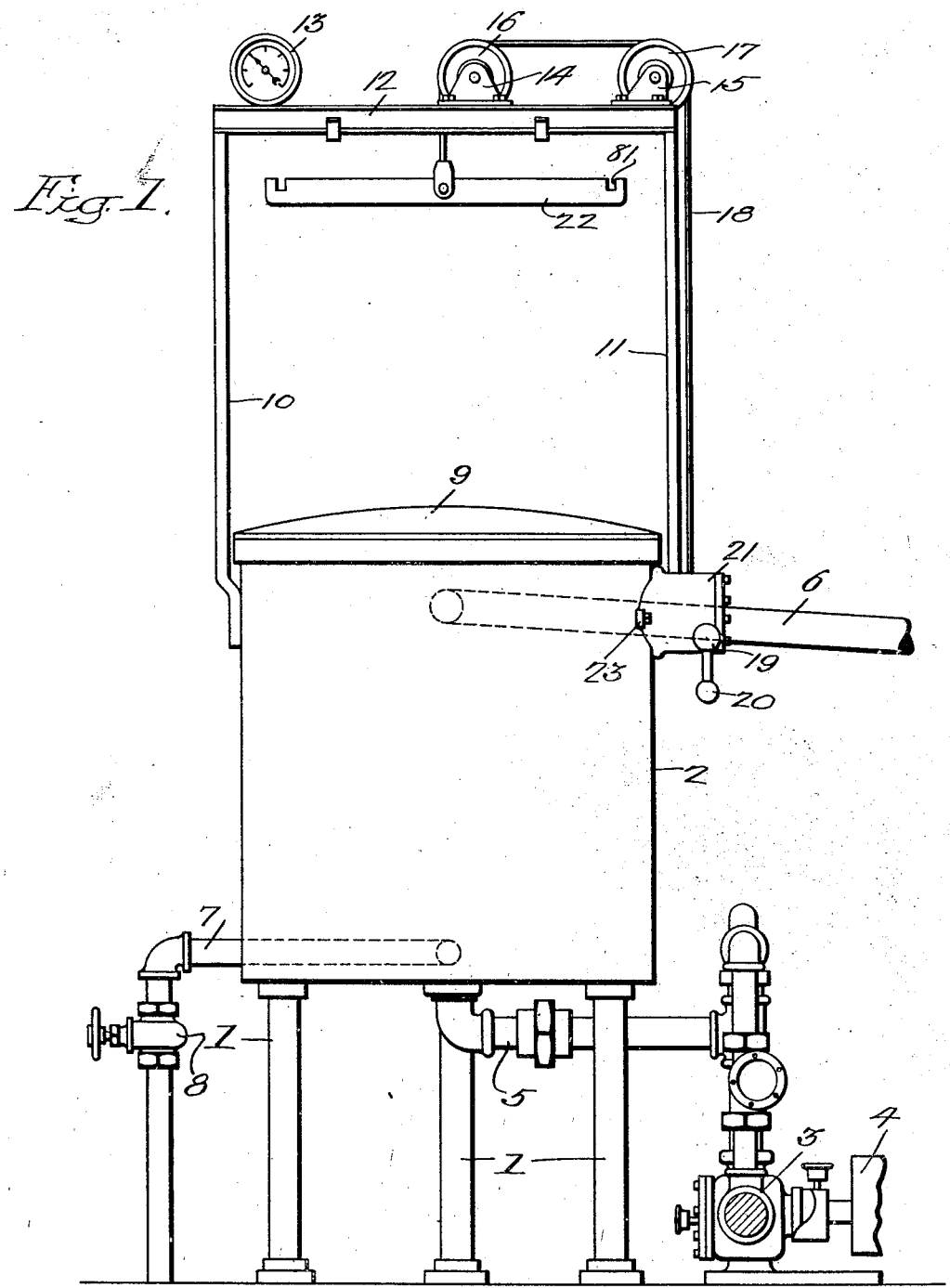
Fig. 1 is an elevation on a reduced scale of the completed filtering device.

At 1 are illustrated legs supporting a container or tank 2, though it is to be understood that these legs are shown merely for the purpose of exemplification, and that any other suitable type of support may be employed at will without departing from the essential features of my invention. These legs may be varied in height to suit the exigencies and requirements of the particular apparatus in connection with which they are employed. A pump 3, which may be of any conventional type, is employed to pump the dirty solvent from the washing machine, the connection to which is broadly indicated at 4. From the pump, the dirty solvent is carried by suitable means such as the pipe connection 5 to the under part of the tank or container 2. Although it is intended that the clean filtrate is to be returned to the washing machine by means of a connection 6 adjacent the upper extremity of the container 2, provision is made by suitable means such as a pipe 7 and valve 8, arranged adjacent the bottom of the tank, to drain the latter whenever it is desired. A closure member 9 may be provided to cover the tank when the apparatus is in use.

Extending upwardly from the tank 2 and secured in any suitable manner to the sides thereof as by riveting or spot welding, are struts 10 and 11, preferably connected together as by means of a cross member 12. Mounted above the cross member is a pressure gauge 13, denoting in any suitable manner the pressure within the filtering chamber, while also mounted thereon in brackets 14 and 15, respectively, may be pulleys 16 and 17 over which a cable or the like 18 may be passed, connected at one end to a windlass 19 having an operating handle 20, and mounted in a hub 21 extending outwardly from the tank 2, and at its other end to a lifting member 22, the purpose of which will be developed later. The hub 21 of course, may be secured to the tank 2 in any desired manner. In the present instance, bolts 23 are employed.

My invention relates more particularly to the details illustrated in Figs. 2-4. As shown therein, the tank 2 is closed at its bottom by a closure member 24, which preferably has an upstanding and outwardly extending peripheral flange 25 snugly and frictionally engaging the interior wall of the tank 2, or secured thereto in any other suitable manner. This closure member preferably is provided with a substantially centrally located opening 26; which opening may be closed by an inlet member 27 having an opening 28 therein, which latter is preferably provided with a plurality of threads 29 whereby it may be secured to the pipe connection 5. Bolts 30 are illustrated as comprising the means whereby the inlet 27 is secured to the closure member 24, although it is to be understood that these means may be varied at will. A yoke member 31 comprising a plurality of spokes and intervening openings, as indicated in dotted outline at 32, extends between the interior walls of the inlet member 27 and a hub 33. Extending upwardly through this hub may be a reduced portion 34 of a rod 35, the reduced portion being threaded for a portion of its extent and being secured in place by suitable means such as a lock nut 36.

Seated on the upper side of the closure member 24 is a false bottom 37, in recesses 38 of which are preferably mounted upstanding members 39 for a purpose which will be developed hereinafter. It is to be noted that this false bottom is also provided with a central opening, indicated at 40. Resting on the upper face of the false bottom 37 is a screen member 41, preferably provided with a rim 42 and adapted to drain into an arcuate channel 43 formed in the face of the false bottom This screen is carried by a collar, indicated by the reference numeral 44, which comprises in the present instance, a hub member 45 fitted loosely about the rod 35 and a peripheral head member 46 preferably recessed as at 47 for the reception of the screen 41. The hub and the head are connected by a plurality of spokes or struts 48, the opening of which permits the ready passage of the dirty cleaning fluid.

The lowermost member 44 is shown as resting on an annular washer or other suitable type of packing 49, forming an effective seal, though this latter point is not an essential feature of my invention. An annular upstanding ring 50 preferably of metal, though it may be of any suitable material, possessing sufficient rigidity for the purpose, is secured in any suitable manner as by spot-welding, molding or soldering to the rim 42 of each of the screens, or may even rest loosely thereon, and acts as a spacing member and as a rest for the outer end of the adjacent screen arranged thereabove. Carried in between the adjacent screens, space therefor being provided by the ring members 50, are a plurality of collars 51 of slightly different form from that illustrated at 44. Each of these collars, as perhaps best illustrated in Fig. 4, comprises a hub portion 52, substantially radially-extending spokes or struts 53, and an annular head 54. Considerable novelty is resident in the construction of this head, and extending therethrough, preferably one on each side of each of the spoke members 53, are substantially radially extending openings 55. Upstanding and outturned flanges 56 are formed adjacent the inner periphery of the heads 54, one being arranged on each side thereof. These flanges 56 are each adapted to frictionally receive the edges 57 of an opening in a filter bag 58, which edges preferably, though not necessarily, are reinforced by two additional plies of fabric 59. This bag, in the present instance, is preferably comprised of heavy duck, and is machine-sewn, although it may well be made of other material, and may be formed of a single piece of fabric.

The screens 41 with their rings 50 and collars 44 are alternated by the filtering bags 58 and their collars 51 until the desired height and number of bags are mounted on the shaft or rod 35. A combined cover and pressure member 60 is adapted to fit about the rod 35, and to abut by means such as an annular ring 61, the head of the uppermost collar 51. An additional screen member 62 is preferably carried between the topmost ring 50 and the underface of the pressure member 60, which latter is shown as provided with a downturned peripheral flange 63. The rod 35 is threaded at its upper end and is received in a threaded hollow opening 64 of a large wing nut 65. The bearing surface 66 of which abuts a similar surface centrally located on the pressure and cover member 60. By means of the wing nut 65, the various elements of the filter assemblage may be firmly secured in place. Solvent to be filtered may then be passed upwardly through the pump 3 into the interior of the inlet member 27. Passing upwardly through the openings 32 thereof, the liquid flows through the openings between the spokes of the rings 44 and 51, a portion passing interiorly of each of the bags 58 through the openings 55 arranged radially of the heads 54. In this manner, each bag has delivered to it a certain percentage of the entire quantity of liquid delivered to the filtering apparatus. Since there is but one single passage of solvent through each bag, that is, through the openings 55, into the bag, thence through the screen 41 arranged thereuneath, and from thence through the opening 67 between the rim 42 and the exterior of the ring 50 to the exterior, no part of the solvent travels through more than a single bag. In other words, the combined capacity of the twelve bags represents the capacity of the filter.

As the solvent passes through the bag or filtering member, the suspended matter is strained out and left behind therein. The filter and clean solvent then passes through the meshes of the screen and finds its way into the tank of the filtering apparatus, where it accumulates until it discharges through the overflow or return line, indicated at 6. It is to be understood that the accumulation of sediment in the bags gradually increases pressure in the filtering apparatus. This excess pressure ordinarily might detrimentally affect the walls of the container 2. Provision is made for this, however, the pressure being retained by the closure member 24, the pressure rings 50, and the pressure cover 60, so that there is at no time any excess pressure in or on the container 2 itself.

Turning now to the cover member 60, as perhaps best illustrated in Fig. 3, it is noted that in the present instance, it has a plurality of peripherally arranged and outwardly extending lugs 68, each of which is adapted to be urged downwardly by cooperating clamping members 69, these latter comprising a threaded bolt 70, passing downwardly through the leg portions 71 and 72 of a yoke member 73, the head 74 of which is secured in any suitable manner to the interior of the container or tank 2.

It will be noted that because of the friction transfer between the pressure member 60 and the false bottom 37, there will be but little tendency for relative movement between these two members. Accordingly, the upstanding members 39 received in the recesses 38 of the false bottom 37 are utilized as a means of restraining the container 2 from movement relative to the pressure member 60, so that the yoke members 73 of the container 2 will invariably be in operable relation to the lugs 68 on the pressure member. These means take the form of headed bolts 75 threaded or otherwise mounted in the members 39, and engaging substantially U-shaped members 76 preferably having inturned guide members 77, and extending longitudinally of and secured to the interior walls of the tank 2. The upper extremity of the container 2 is preferably reinforced by a surrounding annular ring 77. Means are provided for lifting the pressure member 60, in the form of handles 78 secured to the exterior thereof in any suitable manner as by rivets, bolts or the like 79. Suitable slots 80 are provided adjacent the upper extremity of each of the members 39 adapted to cooperate with the engaging lugs 81 of the bag lifting member 22.

In operation, the filtering members and screens are secured in position on the rod 35, the pressure member 60 is placed in position, and pressure is applied centrally by means of the wing nut 65, and by the yoke-shaped members 73. The cover member 9 is then placed in position, at which time the pump is started. The dirty solvent is then passed from the washer (not shown), through the connection 4, through the pump, and thence upwardly through the connection 5 to the inlet 27, from whence the liquid, passing upwardly, diverges into twelve different streams, collecting finally in the annular opening between the filter members and the interior wall of the tank 2. Building up to a sufficient height, the clean liquid is then exhausted through the connection 6, back into the washing machine. This process may be employed continuously.

Eventually, however, the sediment collecting in the bags 58 will accumulate to such an extent that the filtering properties of the bags are seriously diminished. At that time, the operation of the pump is discontinued, and the excess liquid is drained off through the drain pipe 7. At this time, the cover 9 is removed, the wing nut 54 and yoke members 73 backed off, and the pressure member 60 is removed. By operating the windlass 20, it is possible to then locate the bag lifting member 22 in operable association with the slots 80 in the members 39. By rotating the windlass in the reverse direction, the members 39, the false bottom 37, and the filtering bags and screen may be lifted as a unit from the container 2 and may be removed for cleaning in any suitable manner.

It is obvious that this device creates a distinct and novel advance over the prior art, and accordingly facilitates the rapidity and ease of cleaning and filtering the dirty solvent employed in the garment cleaning industry. It is of course understood that the invention is susceptible to numerous modifications and adaptations, and it is intended that it be limited only by the scope of the appended claims.

I claim:

1. As an element of a filtering apparatus, a filtering bag; and a collar for said bag, located in a substantially central opening therein; said collar having a central hub, an outer, annular head, and spokes or struts extending radially between said hub and said head; means on the exterior of each face of said head for gripping said bag, said head having a plurality of openings extending outwardly therethrough, one on each side of each spoke, and connecting the openings between the spokes with the interior of the filtering bag, thus permitting entrance of the dirty liquid to the bag.

2. As an element of a filtering apparatus, a screen; said screen having a substantially centrally-arranged collar; said collar having a central hub, an annular head, having a circumferential groove therearound, for gripping said filter, and spokes or struts extending radially between the hub and the head; a rim about the circumference of said screen; and an upstanding annular ring on said rim.

3. In a filtering apparatus, a container, a closure member for the bottom of said container, a false bottom on said closure member, a plurality of superposed filters on said false bottom, means extending through said filter and said false bottom for holding them in assembled relation, a plurality of upstanding members fixed on the periphery of said false bottom, means on said upstanding members for preventing relative circular motion between the assembled filters and the container, said closure member, said false bottom and said filters having substantially aligned centrally located openings for the admission of a fluid to be filtered, and means cooperable with said upstanding members to lift the filters and the false bottom bodily as a unit from said container.

4. In a filtering apparatus, a container, a closure member for the bottom of said container, a false bottom on said closure member, a plurality of superimposed filters on said false bottom, means extending through said filter and said false bottom for holding them in assembled relation, a plurality of upstanding members fixed on the periphery of said false bottom, means on said upstanding member for preventing relative circular motion between the assembled filters and the container, said closure member, said false bottom and said filters having substantially aligned centrally located openings for the admission of a fluid to be filtered, and means comprising a cross-bar cooperable with said upstanding members to lift the filters and the false bottom bodily as a unit from said container.

5. In a filtering apparatus, a container, a closure member for the bottom of said container, a false bottom on said closure member, a plurality of superposed filters on said false bottom, means extending through said filters and said false bottom for holding them in assembled relation, guide members on the inner wall of said container, a plurality of upstanding members fixed on the periphery of said false bottom and means on said upstanding members adapted to slidably engage said guide members whereby relative circular motion between the assembled filters and said container is prevented, and means cooperable with said upstanding members supported in suspended relation from said containers for lifting the filters and the false bottom bodily as a unit from said container, said guide members also serving to guide said unit in its removal from said container.

6. In a filtering apparatus, a container, a closure member for the bottom of said container, a false bottom on said closure member, a plurality of superposed filters on said false bottom, means extending through said filters and said false bottom and a pressure member adapted to engage said means for holding said filters and said false bottom in assembled relation, a plurality of guide members on the inner wall of said container, a plurality of upstanding members fixed on the periphery of said false bottom having means thereon to slidably engage said guide members for preventing relative circular motion between the assembled filters and the container, said upstanding members being provided with apertures near their upper extremities, and means comprising a cross-bar supported on said container in suspended relation, the ends of said cross-bar being adapted to be inserted in said apertures whereby said false bottom and said filters may be lifted bodily as a unit from said container, said guide members also serving to guide said unit in its removal from said container.

ANTON L. DORFNER.